United States Patent [19]

Suopajärvi et al.

[11] Patent Number: 4,997,079

[45] Date of Patent: Mar. 5, 1991

[54] PROCEDURE AND MEANS FOR PARALLELLY ALIGNING PIECES OF TIMBER SUCH AS LOGS OR BILLETS

[75] Inventors: Arto Suopajärvi, Lahti; Jari M. J. Suokas, Hollola; Ari O. Lehikoinen, Lahti; Pentti Huhta, Hollola, all of Finland

[73] Assignee: Kone Oy, Helsinki, Finland

[21] Appl. No.: 317,498

[22] Filed: Mar. 1, 1989

[30] Foreign Application Priority Data

Mar. 1, 1988 [FI] Finland ................................ 880942

[51] Int. Cl.$^{5}$ ................................ B65G 47/12

[52] U.S. Cl. ................................ 198/443; 414/745.9

[58] Field of Search ................................ 198/443, 454; 414/745.9, 746.4

[56] References Cited

U.S. PATENT DOCUMENTS

| | | | |
|---|---|---|---|
| 3,214,001 | 10/1965 | Callaghan | 198/430 X |
| 3,581,892 | 6/1971 | Aro | 198/360 |
| 4,101,420 | 7/1978 | Luginbühl | 209/672 |
| 4,199,066 | 4/1980 | Hörzer et al. | 209/672 X |
| 4,852,716 | 8/1989 | Roche | 198/443 |

FOREIGN PATENT DOCUMENTS

| | | | |
|---|---|---|---|
| 1481299 | 1/1969 | Fed. Rep. of Germany | 198/443 |
| 2235536 | 1/1974 | Fed. Rep. of Germany | 198/443 |
| 1407284 | 6/1965 | France | 198/443 |
| 573426 | 9/1977 | U.S.S.R. | 414/745.9 |
| 1375540 | 2/1988 | U.S.S.R. | 198/443 |

*Primary Examiner*—H. Grant Skaggs

*Assistant Examiner*—Cheryl L. Gastineau

*Attorney, Agent, or Firm*—Sughrue, Mion, Zinn, Macpeak & Seas

[57] ABSTRACT

A method and apparatus for parallelly aligning pieces of timber, such as logs and billets, for further handling, comprises the serial feeding of pieces of timber into a sorting zone provided with a fast-rotating drum surface which pushes the timber towards, and aligns the timber with, a more slowly rotating drum surface provided with engagement members. The pieces of timber are aligned on and between the respective drum surfaces so as to be parallel and at right angles to the direction of rotation of said surfaces. The pieces of timber are pushed off in parallelly aligned orientation from the more slowly rotating surface for further handling.

11 Claims, 1 Drawing Sheet

Figure 1:
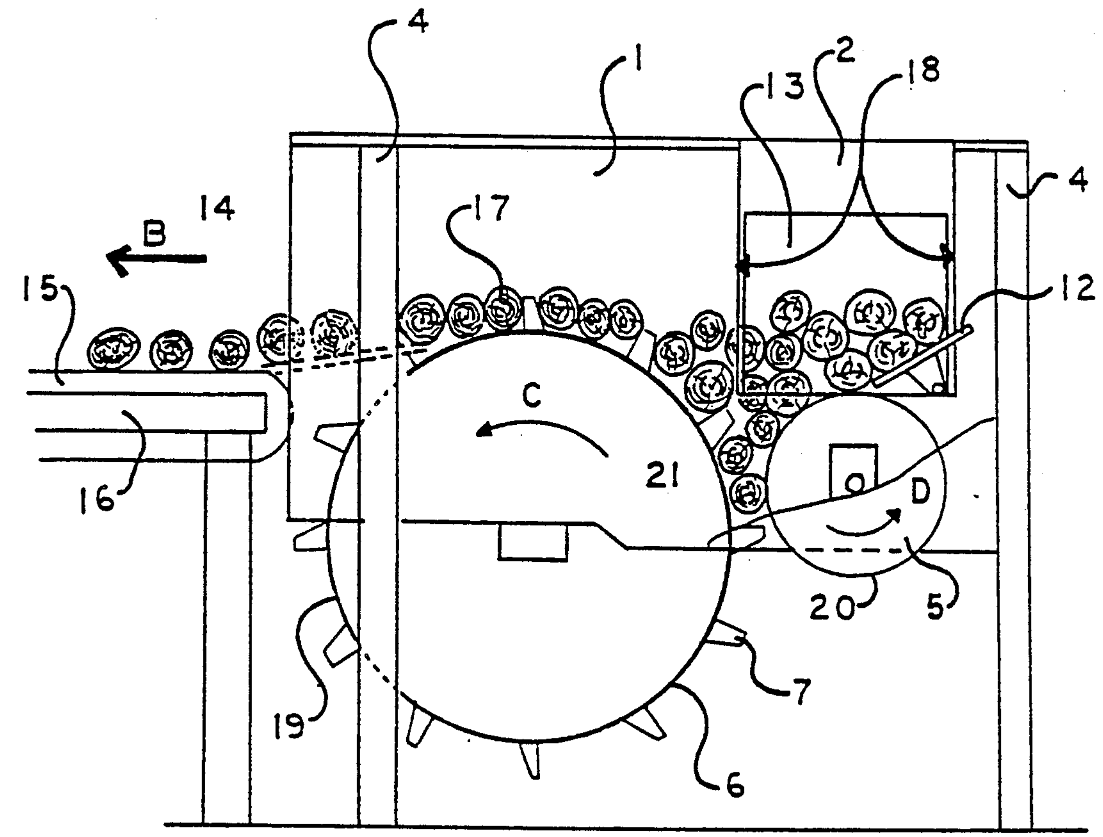

PROCEDURE AND MEANS FOR PARALLELLY ALIGNING PIECES OF TIMBER SUCH AS LOGS OR BILLETS

THE NATURE OF THE INVENTION

The present invention is directed to a method and apparatus for parallelly aligning pieces of timber, such as logs or billets, for further handling.

In the various steps of timber handling in paper and pulp mills and in sawmills a need exists to align the timber pieces parallelly side by side or in a stack. Additionally, in the automatic handling of timber the need for parallel alignment of the pieces of timber is normally more important than it is in unautomated operations. Good functioning of automated apparatus can result in the minimization of the number of misaligned pieces of timber.

THE PRIOR ART

Certain prior art designs teach the use of chain elevators. Such elevators operate on a base formed by a ramp. Paddles or pegs are attached to the chains, which, as they move along with the chains, lift the pieces of timber upward along the ramp. The main drawback of such prior art designs is that, if the pieces of timber to be transported cause a jam, they turn upright, or into other positions, and the intended parallel alignment of the pieces of timber cannot be achieved.

In other prior art timber elevator designs, a drum rotating around a horizontal axis is used. Horizontal lifting members are disposed inside the drum. In such an apparatus the pieces of timber are inserted into the drum, and in the course of its rotation the drum moves the pieces of timber onwards (either upwards or downwards) and transfers them to a removal conveyor. A drawback of such designs relates to problems arising from log jamming. When too many pieces of timber enter the drum, they turn upright and into other positions and are closely packed in the drum. Clearing the jam then requires that the entire apparatus is stopped and the jammed pieces of timber are cleared by sawing.

It is thus evident that presently used types of apparatus are unsatisfactory in terms of good functioning and reliability of operation. This is in part also due to the fact that the nature of the timber to be handled, such as its length, thickness, shape temperature, elastic properties and specific gravity, vary considerably. In addition, the quantity of timber to be handled and the rate at which it is to be handled are greatly variable. As a result, timber handling apparatuses are often dimensioned to operate in a range as large as 1000 to 20,000 pieces per hour.

OBJECT OF THE INVENTION

An object of the invention is to significantly minimize or reduce the above-mentioned drawbacks and provide an advantageous method which is reliable in operation for arranging pieces of timber into aligned position for further handling, such as, for example, processing in a pulping mill. The method of the invention comprises feeding pieces of timber into a sorting apparatus wherein a rapidly rotating surface urges the pieces of timber towards a more slowly rotating surface. On and between the surfaces, the pieces of timber are aligned to be parallel to one another, parallel to the axes of rotation of the surfaces and transverse to the direction in which the surfaces rotate. The pieces of timber are pushed off from the second surface in parallel alignment for further handling.

PREFERRED EMBODIMENTS OF THE INVENTION

In a preferred embodiment of the method of the invention the pieces of timber are fed in a longitudinal direction into the sorting apparatus, through an aperture in a side wall of the apparatus, and onto a substantially smooth outer cylindrical surface of a rapidly rotating drum. The surface pushes the timber towards the cylindrical surface, provided with engaging members such as paddles or pegs, of a more slowly rotating drum. Some of the pieces of timber fall into a pocket defined between the rotating surfaces and the more slowly rotating surface thus lifts the pieces of timber upwardly from that pocket and conveys them in the direction of rotation of the more slowly rotating surface to a removal conveyor for further handling.

In another preferred embodiment of the method of the invention the speed of rotation of the more slowly rotating surface is controlled to conform automatically to the variations of the timber flow and to be of such magnitude that there continuously is a layer of pieces of timber upon the more rapidly rotating surface. In such a preferred embodiment the efficiency of the more rapidly rotating surface in aligning the pieces of timber improves, since the pieces of timber are guided into mutual alignment, by obtaining support from each other.

The invention also includes an apparatus for arranging pieces of timber into aligned position for further handling. The apparatus comprises a frame member provided with support legs having side walls attached thereto and to an end wall between the side walls. A timber-feeding member having first drive machinery is also attached to the frame. A timber-transporting member having second drive machinery means is also attached to the frame. In operation, the pieces of timber are fed into the apparatus such that the timber-feeding member is the first element of the apparatus to engage the timbers once they are inside the apparatus. The timber-feeding member is provided with an outer surface adapted for movement transverse to the longitudinal direction of the pieces of timber being fed into the apparatus. The timber-transporting member is located in the direction of travel of the timber pieces. The timber-transporting member includes an outer surface capable of being moved transversely to the longitudinal direction of the pieces of timber which it is purposed to transport. The speed of movement of the surface of the timber-transporting member is normally lower than the speed of movement of the surface of the timber-feeding member.

In a preferred embodiment of the apparatus of the invention, the timber-feeding member may be a drum having a substantially smooth outer surface and a relatively high speed of rotation. The timber-transporting member may be a relatively slowly rotating drum provided on its outer surface with engaging members in a plurality of substantially straight rows.

In another preferred embodiment of the apparatus of the invention, a pocket-like space is disposed between the timber-feeding member and the timber-transporting member into which pocket some of the pieces of timber may fall.

In yet another preferred embodiment of the apparatus of the invention, a side wall above the timber-feeding member, is provided with an aperture for feeding pieces of timber into the apparatus. The corresponding area of the other side wall is provided with a reinforcing plate structured to receive and withstand impact from the pieces of timber fed into the apparatus.

In still another preferred embodiment of the apparatus of the invention, in the rear part of the apparatus is provided an inclined guide plate disposed partly over the timber-feeding member.

In still another preferred embodiment of the apparatus of the invention, the diameter of the timber-feeding member is smaller than the diameter of the timber-transporting member and the upper surface of the timber-feeding member is at a height lower than the upper surface of the timber-conveying member.

Figure 2:
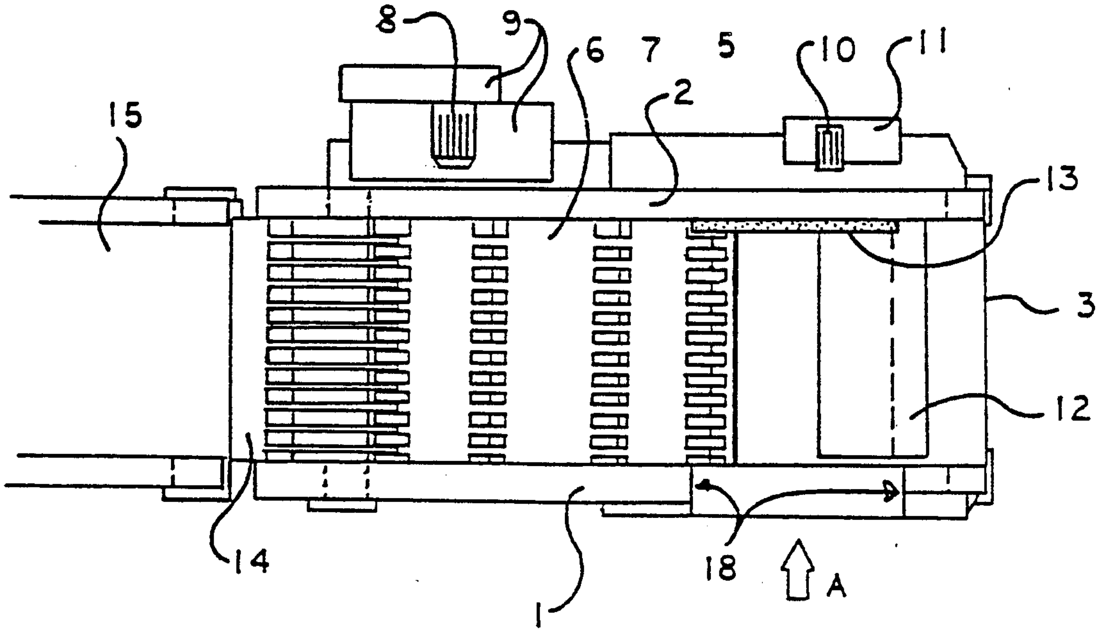

The invention is described in more detail with reference to the attached drawings in which:

FIG. 1 is a side view of one embodiment of the means of the invention, partly sectioned on the lower half, and FIG. 2 is a top view of the embodiment shown in FIG. 1.

The apparatus of the invention may be comprised of a separate unit in the overall timber handling chain assembly. It may comprise, for example, a conveyor, a feeding means for a barking station, a barking station, a conveyor means and a further handling means all of which components being arranged in operating relationship.

The apparatus of the invention should be placed at a suitable height on support legs 4 to which are attached the side wall 1 on the feed side and the corresponding side wall 2, and a rear wall 3 connecting the two. The walls are not extended all the way to the ground or floor, with a view to facilitating maintenance or potential trouble-shooting. In the upper part of the side wall 1 is located an aperture 18 for feeding timber into the apparatus. The pieces of timber 17 are fed into the apparatus, in the direction indicated by arrow A, with the aid of a feeding conveyor, for instance a roller conveyor (not depicted), through the aperture 18 in the side wall 1, in the longitudinal direction of the timber. This step may cause the pieces of timber to be inadvertantly thrown against the side wall 2, which at the respective area is reinforced with a reinforcing plate 13. Between the side wall 1 and side wall 2 is placed a rotating drum 5 serving as a timber-feeding member, one end of its axis of rotation being fixed to the side wall 1 and the other end, to the side wall 2. The axis of the drum is thereby perpendicular to the timber feeding direction. The top surface of the drum is approximately level with the lower edge of the aperture 18 in the side wall 1. The drum 5 is driven by a motor 10 located behind the side wall 2 but is connected to the drum 5 over a speed-changing gear 11. The outer surface of the drum 5 serves as a timber-feeding member and is usually smooth, or almost smooth, and no actual engagement members are needed in operation. A rotatable drum 6 is disposed substantially parallel to the drum 5. The drum 6 has a significantly larger diameter than the timber feeding drum 5 and serves as a timber-transporting member. As with drum 5, the drum 6 is also disposed between the side wall 1 and side wall 2 and is located downstream from the drum 5. The direction of rotation C of the drum 6 is the same as the direction of rotation D of the drum 5, but the speed of rotation is considerably slower than that of the drum 5. The drive of the drum 6 is derived from a motor 8 behind the side walls 2, connected to the drum 6 over a speed-reduction gear 9.

It may be noted that the feeding member 5 and the transporting member 6 need not necessarily be drum-shaped: they may for example be short chain conveyors or other equivalent units suitably structured for operation herein.

The outer surface 19 of the drum 6 is provided with sprocket-like engagement members 7 extending outwardly from the outer periphery of the drum 6 in substantially equally spaced straight rows. The engagement members 7 are likewise uniformly spaced in each of the structured rows since they are required to clear the tines of a comb plate 14 provided on the exit side of the drum 6. The distance between the drums 5 and 6 and their placement is so selected to ensure that the drums are free to rotate at different speeds and also that the V-shaped pocket-like space 21 into which part of the timber falls for a brief period is defined between the drums. In addition, the upper surface of the drum 5 is disposed at a height lower than the upper surface of the drum 6. The comb plate 14 is inclined in an upstream direction and its position is so selected that the pieces of timber coming from the drum 6 proceed in transversely oriented disposition, along the comb plate to the removal conveyor 15, in the direction of arrow B. A belt conveyor may, for example, serve as the removal conveyor, which may obtain its drive from separate drive machinery. The removal conveyor is a separate unit, having for example an independent frame member 16. Upstream, and partly over the drum 5, there is provided an inclined guide plate 12 to assist the timber in its travel towards the drum 6 and to prevent pieces of timber from falling into the space between the drum 5 and the rear wall 3.

The method of the invention will become still more apparent from the following description of the operation of the apparatus.

The pieces of timber 17 are fed longitudinally in the direction of arrow A, through the aperture 18 onto the drum 5. The drum 5 rotates at high speed and urges the pieces of timber against the drum 6, whereby any bouncing and rebounding pieces of timber are induced to descend and to position themselves parallel to the surface 19 of the drum 6. In addition, the drum 5 feeds pieces of timber into the pocket 21 between the drums, whereby a sufficient reserve is produced for transient capacity peaks. The available capacity can be adjusted e.g. by controlling the speed of rotation of the drum 6. In exacting and difficult conditions, the speed of rotation of the drum 6 transporting the timber will be controlled to conform automatically to the variations in timber flow and to be high enough to cause the formation of a layer of pieces of timber upon the feeding drum 5 at all times. Thus, the efficiency of the feeding drum in aligning the pieces of timber is enhanced since the pieces of timber are guided into mutual alignment by obtaining support from each other.

It will be obvious to a person skilled in the art that the invention is not exclusively confined to the examples described herein and that modifications are contemplated within the scope of the claims presented below.

We claim:

1. A method for arranging pieces of timber into aligned position for further handling, comprising feeding said pieces of timber into a sorting zone, providing a rapidly rotating surface in said sorting zone for urging said pieces of timber towards a slowly rotating surface having an axis of rotation substantially parallel to the axis of rotation of said rapidly rotating surface, so as to align said pieces of timber into a mutually parallel relationship and generally parallel to the axes of rotation of said surfaces, permitting said aligned pieces of timber to travel over said slowly rotating surface and urging said pieces of timber in parallel alignment from said slowly rotating surface for further handling.

2. A method as claimed in claim 1, wherein said pieces of timber are fed in a longitudinal direction into said sorting zone through an aperture in a side wall of said sorting zone and said rapidly rotating surface comprises the substantially smooth outer cylindrical surface of a rapidly rotating drum, and said slowly rotating surface comprises a drum provided with peripheral engagement members and wherein some of said pieces of timber fall into a pocket defined between said rotating surfaces, and said slowly rotating surface lifts said pieces of timber up from said pocket by means of said engagement members and transports them in the direction of rotation of said slowly rotating surface to a removal conveyor for further handling.

3. An apparatus for arranging pieces of timber delivered in a longitudinal direction into parallelly aligned position for further handling, comprising a frame member having side walls attached thereto, and an end wall between said side walls, said frame member having furthermore attached thereto a timber-feeding member having first drive machinery means and a timber-transporting member having second drive machinery means, such that in operation said timber-feeding member is the first element of said apparatus to engage said pieces of timber when they are inside said apparatus and is provided with an outer surface adapted for rotational movement transverse to the longitudinal direction of feeding said pieces of timber into said apparatus, and said timber-transporting member being located in the direction of travel of said pieces of timber following engagement with said timber-feeding member, said timber-transporting member including an outer surface capable of being moved transversely to the longitudinal direction of travel of said pieces of timber for transporting same, the speed of movement of said surface of said timber-transporting member being lower than the speed of movement of the surface of said timber-feeding member.

4. An apparatus as claimed in claim 3, wherein a pocket-like space is provided between said timber-feeding member and said timber-transporting member and so positioned to receive some of said pieces of timber falling from said timber-feeding member.

5. An apparatus as claimed in claim 3, in which one of said side walls is provided with an aperture for feeding pieces of timber into said apparatus, and the other of said sidewalls is provided with a reinforcing plate capable of receiving impacts from pieces of timber fed into said apparatus.

6. An apparatus as claimed in claim 3, in which the rear part of said apparatus, partly over the timber feeding member, is provided with an inclined guide plate.

7. An apparatus for arranging pieces of timber delivered in a longitudinal direction into parallelly aligned position for further handling, comprising a frame member having side walls attached thereto, and an end wall between said side walls, said frame member having furthermore attached thereto a timber-feeding member having first drive machinery means and a timber-transporting member having second drive machinery means, such that in operation said timber-feeding member is the first element of said apparatus to engage said pieces of timber when they are inside said apparatus and is provided with an outer surface adapted for rotational movement transverse to the longitudinal direction of feeding said pieces of timber into said apparatus, and said timber-transporting member being located in the direction of travel of said pieces of timber following engagement with said timber-feeding member, said timber-transporting member including an outer surface capable of being moved transversely to the longitudinal direction of travel of said pieces of timber for transporting same, the speed of movement of said surface of said timber-transporting member being lower than the speed of movement of the surface of said timber-feeding member, and wherein said timber-feeding member is a drum having a substantially smooth outer surface and a relatively high speed of rotation and said timber-transporting member is a relatively slowly rotating drum provided on its outer surface with engagement members in a plurality of substantially straight rows.

8. An apparatus as claimed in claim 7, wherein a pocket-like space is provided between said timber-feeding member and said timber-transporting member and so positioned to receive some of said pieces of timber falling from said timber-feeding member.

9. An apparatus as claimed in claim 7, in which one of said side walls is provided with an aperture for feeding pieces of timber into said apparatus, and the other of said sidewalls is provided with a reinforcing plate capable of receiving impacts from pieces of timber fed into said apparatus.

10. An apparatus as claimed in claim 7, in which the rear part of said apparatus, partly over the timber feeding member, is provided with an inclined guide plate.

11. An apparatus as claimed in claim 7, wherein the diameter of said timber-feeding member is smaller than that of said timber-transporting member and the upper surface of said timber-feeding member is at a height lower than the upper surface of said timber-transporting member.

* * * * *